United States Patent
Manna et al.

(10) Patent No.: US 6,603,585 B2
(45) Date of Patent: Aug. 5, 2003

(54) MULTIPLE-WAVELENGTH OPTICAL COMMUNICATION SYSTEM WITH OPTICAL AMPLIFIERS

(75) Inventors: Massimo Manna, Eaton Town, NJ (US); Corrado Rocca, Monza (IT)

(73) Assignee: Pirelli Submarine Telecom Systems Italia S.p.A., Milan (IT)

( * ) Notice: Subject to any disclaimer, the term of this patent is extended or adjusted under 35 U.S.C. 154(b) by 93 days.

(21) Appl. No.: 09/948,672

(22) Filed: Sep. 10, 2001

(65) Prior Publication Data

US 2002/0060821 A1 May 23, 2002

Related U.S. Application Data

(63) Continuation of application No. PCT/EP00/02050, filed on Mar. 9, 2000.
(60) Provisional application No. 60/123,917, filed on Mar. 12, 1999.

(30) Foreign Application Priority Data

Mar. 11, 1999 (EP) .............................................. 99200733

(51) Int. Cl.[7] .............................................. H04B 10/00
(52) U.S. Cl. ...................... 359/161; 359/154; 359/173; 359/124
(58) Field of Search ................................ 359/154, 161, 359/173, 124

(56) References Cited

U.S. PATENT DOCUMENTS

| | | | |
|---|---|---|---|
| 5,267,073 A | 11/1993 | Tamburello et al. | 359/179 |
| 6,097,535 A * | 8/2000 | Terahara | 359/341.41 |
| 6,211,981 B1 * | 4/2001 | Watanabe | 359/133 |

FOREIGN PATENT DOCUMENTS

GB    2 314 225    12/1997

OTHER PUBLICATIONS

T. Naito, et al., "20–NM Signal bandwidth after 147–amplifier chain using long–period gain–equalizers" Optical Fiber Communication Conference and Exhibit, 1998 OSA Technical Digest Serier, vol. 2, pp. 320–321, (Feb. 1998).

(List continued on next page.)

Primary Examiner—Jason Chan
Assistant Examiner—Christina Y Leung
(74) Attorney, Agent, or Firm—Finnegan, Henderson, Farabow, Garrett & Dunner, L.L.P.

(57) ABSTRACT

An optical communication system comprising
  a first apparatus for supplying at least three optical signals, each having a predetermined wavelength selected from a first range of wavelengths $\Delta\lambda$;
  an optical transmission line, optically connected to the first apparatus, for the transmission of the at least three optical signals, the optical transmission line comprising in its turn
    i. at least one optical amplification system having a predetermined gain spectrum which, in the first range of wavelengths $\Delta\lambda$, has a maximum and a minimum gain (expressed in dB), the difference between the maximum and minimum gain being $\Delta G_{tot}$, and
    ii. at least one filter, associated with the at least one optical amplification system, and capable of attenuating the power of the at least three optical signals according to a predetermined attenuation curve as a function of the wavelength, the attenuation curve having, in the first range of wavelengths $\Delta\lambda$, a maximum and a minimum attenuation (expressed in dB), the difference between the maximum and the minimum being $\Delta L$; and
  a second apparatus for receiving the at least three optical signals,
characterized in that the said power of the at least three optical signals is associated with a preselected pre-emphasis and the $\Delta L$ is at least 0.5 dB greater than the $\Delta G_{tot}$.

10 Claims, 3 Drawing Sheets

OTHER PUBLICATIONS

O.K. Tanguz et al., "Gain Equalization of EDFA Cascades", Journal of Lightwave Technology, vol. 15, No. 10, pp. 1832–1841, (Oct. 1997).

F. Forghiere et al., "Simple Model of Optical Amplifier Chains to Evaluate Penalties in WDM Systems", Journal of Lightwave Technology, vol. 16, No. 9, pp. 1570–1576, (Sep. 1998).

D. Chiaroni et al., "New 10 GBIT/S 3R NRZ Optical Regenerative Interface Based on Semiconductor Optical Amplifiers for All–Optical Networks", ECOC, No. 448, pp. 41–44, (Sep. 1997).

L. Billès, et al., "20 GBIT/S Optical 3R Regenerator Using SOA Based Mach–Zehnder Interferometer Gate", ECOC, No. 448, pp. 269–272, (Sep. 1997).

G.P. Agrawal, "Non Linear Fiber Optics", ECOC, No. 448, pp. 269–272, Sep. 1997.

L.F. Stakes, "Optical–Fiber Filters for Wavelength Division multiplexing", Practical LEOS Applications, Circuits & Devices, pp. 49–50, (Sep. 1996).

J. Li, et al., "Gain Equalization by Mitigating Self–Filtering Effect in a Chain of Cascaded EDFA's for WDM Transmissions", Journal of Lightwave Technology, vol. 13, No. 11, pp. 2191–2196, (Nov. 1995).

M.A. Ali, et al., "Perforamnce of Erbium–Doped Fiber Amplifier Cascades in WDM Multiple Access Lightwave Networks", IEEE Photonics Technology Letters, vol. 6, No. 9, pp. 1142–1145, (Sep. 1994).

K. Inoue et al., "Tunable Gain Equalization Using a Mach–Zehnder Optical Filter in Multistage Fiber Amplifiers", IEEE Photonics Technology Letters, vol. 3, No. 8, pp. 718–720 (Aug. 1991).

A.M. Vengsarkar et al., "Long–Period Fiber–Grating–Based Gain Equalizers", Optics Letters, vol. 21, No. 5, pp. 336–338, (Mar. 1996).

A.R. Chraplyvy et al., "Equalization in Amplified WDM Lightwave Transmission System", IEEE Photonics Technology Letters, vol. 4, No. 8, pp. 920–922, (Aug. 1992).

D. Breuer et al., Unrepeated 40–Gb/s RZ Single–Channel Transmission at 1.55 $\mu$m Using Various Fiber Types, IEEE Photonics Technology Letters, vol. 10, No. 6, pp. 822–824, (Jun. 1998).

A.M. Vengsarkar et al., "Long–Period Fiber Gratings as Band–Rejection Filters", Journal of Lightwave Technology, vol. 14, No. 1, pp. 58–65, (Jan. 1996).

* cited by examiner

MULTIPLE-WAVELENGTH OPTICAL COMMUNICATION SYSTEM WITH OPTICAL AMPLIFIERS

CROSS REFERENCE TO RELATED APPLICATIONS

This application is a continuation of International Application No. PCT/EP00/02050, filed Mar. 9, 2000, which is incorporated by reference herein and claims the priority of EP99200733.6, filed Mar. 11, 1999, and the benefit of U.S. Provisional Application No. 60/123,917, filed Mar. 12, 1999, which is incorporated by reference herein.

The present invention relates to a multiple-wavelength optical communication system with optical amplifiers having optimized performance, and a method for optimizing the said performance.

There are known multiple-wavelength (Wavelength Division Multiplexing, WDM) optical communication systems in which the information to be transmitted is carried by a plurality of signals, each at a predetermined wavelength (channels). In long-distance WDM systems, use is increasingly made of optical amplifiers which are connected between sections of optical fibre to amplify the signals which are attenuated during propagation in the said sections, and thus to increase the distances which can be covered with these WDM systems. However, conventional optical amplifiers, for example those of the rare earth doped fibre type or the semiconductor type, have the disadvantage that they do not have a flat gain spectrum (gain as a function of the wavelength). Instead, they have a gain spectrum which varies with the wavelength according to a predetermined curve. Consequently, the different channels of a WDM system are not amplified uniformly along the transmission line, and therefore their optical signal to noise ratios (SNR) differ from each other (non-equalized optical SNR) at the receiving point at the end of the cascade of optical amplifiers.

In the present description and in the attached claims, the expression "optical signal to noise ratio" is used to denote the ratio, at the receiving point (at the end of the cascade of optical amplifiers), between the optical power of a channel and the optical noise power due to the spontaneous emission (Amplified Spontaneous Emission, ASE) of the optical amplifiers which is present in the optical band about the said channel. In its turn, the expression "optical band of a channel" is used to denote the band of the optical filter which is used in the receiving equipment of an optical communication system to filter the optical noise and to separate this channel from the others with respect to wavelength. Typically, this optical band ranges from 0.2 nm to 1 nm.

In general, the optical SNR is greater for channels having wavelengths corresponding to a higher gain, and smaller for channels having wavelengths corresponding to a lower gain. This difference in amplification and optical SNR between one channel and another increases with an increase in the number of optical amplifiers in cascade along a WDM transmission line, since the gain spectrum at the output of a chain of optical amplifiers becomes narrower and higher as the number of optical amplifiers in cascade increases (a phenomenon conventionally known as "self-filtering").

Some methods have been proposed to limit the disadvantages due to the dependency of the gain of an optical amplifier on the wavelength and due to the "self-filtering" of an optical communication system with a chain of optical amplifiers.

Li et al. ["Gain equalization by mitigating self-filtering effect in a chain of cascaded EDFA's for WDM transmissions", Journal of Lightwave Technology, vol. 13, No. 11, pp. 2191–2196, November 1995] describe a method consisting in the use of erbium-doped optical amplifiers with alternately high and low population inversion levels along a chain of optical amplifiers.

M. A. Ali et al. ["Performance of erbium-doped fiber amplifier cascades in WDM multiple access lightwave networks", IEEE Photonics Technology Letters, vol. 6, No. 9, pp. 1142–1145, September 1994] describe a method based on the selection of parameters (e.g. pump wavelength, pump power, length of the active fibre, power of the input signals) of an erbium-doped optical amplifier.

These methods, however, have the disadvantage of requiring optical amplifiers which are suitably designed and different from one another. Consequently they are not applicable to optical communication systems already fitted with their own optical amplifiers.

K. Inoue et al. ["Tunable gain equalization using a Mach-Zehnder optical filter in multistage fiber amplifiers", IEEE Photonics Technology Letters, vol. 3, No. 8, pp. 718–720, August 1991] describe a filter to be connected at the output of each amplifier of a cascade of ordinary optical amplifiers to equalize its gain. However, this solution requires the installation of an optical filter for each optical amplifier and this makes the optical communication system more complex and expensive.

However, in this article no reference is made at any point to the equalization of the optical SNR.

Ashish M. Vengsarkar et al. ["Long-period fiber-grating-based gain equalizers", Optics Letters, Vol. 21, No. 5, pp. 336–338, March 1996] propose that the gain of a cascade of optical amplifiers be equalized by means of a grating of optical fibres having a transmission spectrum equal to the inverse of the gain spectrum of the cascade of optical amplifiers.

However, this device is not used to equalize the optical SNR.

This disadvantage is also inherent in the device described in British Patent 2314225. This describes an optical filter for flattening the gain spectrum of an optical amplification system, comprising at least one optical amplifier, which is connected in a transmission line in which a plurality of wavelength multiplexed optical signals is transmitted. The optical filter, installed at the output of the said optical amplification system, has, like the device described by Vengsarkar, a transmission spectrum whose characteristics are the inverse of those of the gain spectrum of the said optical amplification system, and consequently the difference between the maximum loss and the minimum loss of the said transmission spectrum of the filter is equal to the difference between the maximum and the minimum of the gain spectrum of the said optical amplification system. Additionally, to overcome the fact that this device has a spectrum which varies with the temperature, the transmission spectrum of the said filter lies within a range of wavelengths which is narrower than the range of wavelengths of the gain spectrum of the said optical amplification system and is entirely contained within it, so that the temperature variations doe not shift the former range outside the latter.

Ozan K. Tonguz et al. ["Gain equalization of EDFA cascades", Journal of Lightwave Technology, Vol. 15, No. 10, October 1997, pp. 1832–1841) present the results of a study which they carried out on the impact of the wavelength dependence of the gain spectrum of erbium-doped fibre amplifiers on a multiple-channel optical transmission system with direct detection.

However, these do not equalize the optical SNR and disregard the effects of non-linear phenomena which arise in an optical fibre when optical signals are transmitted with relatively high power and/or over a medium/long distance, as in submarine systems for example.

In order to equalize the optical SNR, A. R. Chraplyvy et al. ["Equalization in amplified WDM lightwave transmission system", IEEE Photonics Technology Letters, vol. 4, No. 8, pp. 920–922, August 1992] have proposed a method consisting in the transmission of the different channels of a WDM system with more or less high transmission powers according to the gain spectrum of the optical amplifiers being used. However, the inventors of the present invention have observed that this method does not take into account non-linear phenomena which arise in an optical fibre when optical signals are transmitted with relatively high power and/or over medium/long distances.

Additionally, Fabrizio Forghieri et al. ["Simple model of optical amplifier chains to evaluate penalties in WDM systems", Journal of Lightwave Technology, Vol. 16, No. 9, pp. 1570–1576, 1998] propose a mathematical model for comparing the optical SNR of a WDM optical communication system, having optical amplifiers with a non-flat spectrum, with the optical SNR of a hypothetical WDM optical communication system having ideal optical amplifiers (flat gain spectrum). More particularly, the task of this model is to identify the penalty incurred by the optical SNR of a WDM optical communication system having optical amplifiers with a non-flat spectrum when a pre-emphasis which equalizes the optical SNR is associated with the power of the optical signals, or in other words when the transmission powers of the different channels are selectively modified in such a way as to equalize the optical SNR at the reception point. In general, the aim is to attain this objective by incrementing the power of the channels having wavelengths corresponding to a lower gain as compared with the power of the channels having wavelengths corresponding to a higher gain.

However, this model also fails to take into account non-linear phenomena both in the presence and in the absence of equalizing filters of the conventional type.

Naito et al: '20-nm signal bandwidth after 147-amplifier chain using long-period gain-equalizers' optical fiber communication conference and exhibition, OFC'98, vol. 2, 222–27 February 1998, pages 320–321, XP002121562 San Jose, Calif., USA, discloses a WDM transmission system having the feature of the preamble of claim 1. This document, however, does not appreciate that the performance of the system deteriorates because of non-linear phenomena which introduce additional noise into the channels of the system both in the presence and in the absence of conventional equalizing filters when the transmission powers of the different channels are transmitted with a pre-emphasis such that the optical SNR is equalized.

The inventors of the present invention have realized that, when the transmission powers of the different channels of a conventional WDM optical communication system are transmitted with a pre-emphasis such that the optical SNR is equalized, the performance of this system deteriorates as a result of non-linear phenomena which introduce additional noise into the different channels of the system both in the presence and in the absence of equalizing filters of the conventional type. These non-linear phenomena represent a serious problem in optical communication systems, since they arise in an optical fibre when optical signals are transmitted at relatively high powers and/or over medium/long distances and their effects increase with an increase in the power of the optical signals and in the total length of the link. Typical examples of these non-linear phenomena are four wave mixing (FWM), self phase modulation (SPM), cross phase modulation (XPM), modulation instability (MI), stimulated Raman scattering (SRS) and stimulated Brillouin scattering (SBS).

In order to optimize the performance of an optically amplified WDM optical communication system while simultaneously minimizing the occurrence of non-linear phenomena, the inventors of the present invention have proposed the equalization of the optical SNR of this system with rather low levels of pre-emphasis.

This problem has been unexpectedly resolved by connecting at least one filter having a distinctive transfer function in an optically amplified WDM optical communication system.

In a first aspect, the present invention therefore relates to an optical communication system comprising
- a first apparatus for supplying at least three optical signals, each having a predetermined wavelength selected from a first range of wavelengths Δλ and a preselected optical power;
- an optical transmission line, optically connected to the said first apparatus, for the transmission of the said at least three optical signals, the said optical transmission line comprising in its turn
  i. at least one optical amplification system having a predetermined gain spectrum which, in the said first range of wavelengths Δλ, has a maximum and a minimum gain (expressed in dB), the difference between the said maximum and minimum gain being $\Delta G_{tot}$, and
  ii. at least one filter, associated with the said at least one optical amplification system, and capable of attenuating the power of the said at least three optical signals according to a predetermined attenuation curve as a function of the wavelength, the said attenuation curve having, in the said first range of wavelengths Δλ, a maximum and a minimum attenuation (expressed in dB), the difference between the said maximum and the said minimum being ΔL; and
- a second apparatus for receiving the said at least three optical signals, characterized in that the said power of the said at least three optical signals is associated with a preselected pre-emphasis and the said ΔL is at least 0.5 dB greater than the said $\Delta G_{tot}$.

In the present description and in the attached claims, the expression "pre-emphasis" is used to denote the difference in power ($P_{max}-P_{min}$) between the channel which has the highest power ($P_{max}$) at the input of the amplifier chain and that which has the lowest power ($P_{min}$), where the values of power are expressed in dBm.

Additionally, in the present description and in the attached claims, the values of attenuation are all expressed in absolute terms. For example, an attenuation value of 2 dB implies a decrease of 2 dB in the power of an optical signal (10 dBm, for example), so that the attenuated signal will have a power of 8 dBm.

Preferably, the said pre-emphasis of the power of the said at least three optical signals is preselected in such a way that there is an equalized optical signal-to-noise ratio at the output of the said optical transmission line.

Typically, the said pre-emphasis is at least 0.2 dB.

Preferably, the said first range of wavelengths Δλ is at least 3 nm. More preferably, it is at least 5 nm. Even more preferably, it is at least 10 nm. Even more preferably, it is at least 15 nm.

Typically, the said first range of wavelengths Δλ is selected from a second range of wavelengths lying between 1300 nm and 1700 nm. More typically, the said second range of wavelengths lies between 1500 nm and 1650 nm. Even more typically, it lies between 1520 nm and 1600 nm.

Typically, the said optical transmission line comprises an optical fibre incorporated, preferably, in an optical cable.

Typically, the said optical transmission line has a total length of between 300 and 9000 km. More typically, the said total length is between 300 and 6500 km. Even more typically, the said total length is between 500 and 3000 km.

Advantageously, the said at least one optical amplification system comprises at least one optical amplifier with a predetermined gain spectrum. More advantageously, the said at least one optical amplification system comprises a plurality of optical amplifiers with a predetermined gain spectrum.

Preferably, the optical amplifiers of the said at least one optical amplification system all have substantially the same gain spectrum.

Preferably, the said at least one filter is located after the said at least one optical amplification system.

When required by the path of the said optical transmission line, the said optical transmission line comprises a plurality (n) of optical amplification systems and a plurality (n−1) of filters located between one amplification system and another.

In this case, for each filter the said difference ΔL between the maximum and the minimum attenuation is at least 0.5 dB greater than the smallest $\Delta G_{tot}$ of all the $\Delta G_{tot}$ of the said (n) optical amplification systems.

In one embodiment, each of the (n) optical amplification systems comprises the same number of optical amplifiers. In an alternative embodiment, at least one optical amplification system comprises a number of optical amplifiers different from that of the other optical amplification systems.

Additionally, each of the said (n) optical amplification systems may have a $\Delta G_{tot}$ different from that of the other optical amplification systems.

In one embodiment, the optical amplifiers belonging to one optical amplification system have gain spectra which are substantially the same as each other and different from those of the optical amplifiers belonging to another optical amplification system.

In another embodiment, the optical amplifiers of the said plurality of said optical amplification systems all have substantially the same gain spectrum.

Typically, the said optical amplifiers are of the optical fibre type doped with at least one rare earth. Preferably, the said at least one rare earth is erbium.

In one variant, the said optical amplifiers are of the semiconductor type.

Preferably, the said at least one filter is selected from the group of devices comprising an optical fibre grating, a micro-optical interference filter, a device formed by a combination of the two preceding technologies and an optical filter of the Mach-Zehnder type.

In a first embodiment, the said difference ΔL between the said maximum and the said minimum attenuation is at least 0.75 dB greater than the said $\Delta G_{tot}$. In a second embodiment, the said ΔL is at least 1 dB greater than the said $\Delta G_{tot}$. In a third embodiment, it is at least 2 dB greater. In a fourth embodiment, it is at least 3 dB greater.

Typically, the said maximum of the said attenuation curve of the said filter is located at a distance less than or equal to 5 nm from the centre of the said first range of wavelengths Δλ. More typically, the said maximum is located at a distance less than or equal to 3 nm from the said centre. Even more typically, it is located at a distance less than or equal to 1 nm from the said centre. In one embodiment it is located approximately at the said centre.

Advantageously, the said minimum of the attenuation curve of the said filter has an attenuation of at least 2 dB. More advantageously, the attenuation is at least 1 dB. Even more advantageously, it is at least 0.5 dB. Additionally, the said minimum is typically located at one of the two ends of the said first range of wavelengths Δλ. In one embodiment, the said attenuation curve has a minimum at both ends of the said first range of wavelengths Δλ.

In a second aspect, the present invention relates to a method for optimizing the performance of a WDM optical communication system, comprising the phases of a) supplying at least three optical signals, each having a predetermined power and having a predetermined wavelength selected from a first range of wavelengths Δλ;

b) sending the said at least three optical signals along an optical transmission line;

c) amplifying, in the said optical transmission line, the said at least three optical signals according to a predetermined gain spectrum which, in the said first range of wavelengths Δλ, has a maximum and a minimum gain (expressed in dB), the difference between the said maximum and the said minimum gain being $\Delta G_{tot}$;

d) attenuating the power of the said at least three optical signals, amplified in this way, according to a predetermined attenuation curve as a function of the wavelength, the said attenuation curve having, in the said first range of wavelengths Δλ, a maximum and minimum attenuation (expressed in dB), the difference between the said maximum and the said minimum being ΔL; and e) receiving the said at least three optical signals, characterized in that the said power of the said at least three optical signals is associated with a preselected pre-emphasis and in that the said ΔL is at least 0.5 dB greater than the said $\Delta G_{tot}$.

For information on the characteristics of the said at least three optical signals, of the said attenuation curve, of the said first range of wavelengths and of the said optical transmission line, reference should be made to what has been stated above.

The characteristics and advantages of the invention will now be explained with reference to embodiments represented by way of example and without restriction in the attached drawings, in which.

Figure 1:
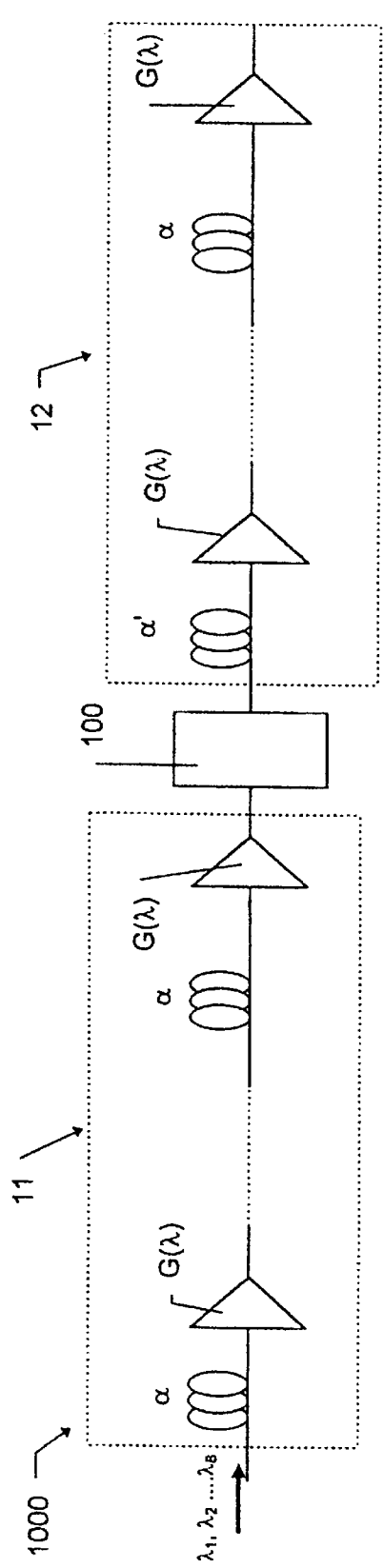
FIG. 1 shows a first embodiment of an optical communication system according to the invention.

In a first embodiment shown in FIG. 1, an optical communication system 1 according to the invention comprises a transmitting apparatus, a receiving apparatus (neither of which is shown) and an optical transmission line 1000.

The said transmitting apparatus is a conventional WDM apparatus capable of supplying m optical signals (channels) having a predetermined power and a predetermined wavelength $\lambda_1, \lambda_2 \ldots \lambda_m$, each being different from the others. Additionally, according to the prior art, the said transmitting apparatus wavelength multiplexes the said channels and sends them along the optical transmission line 1000.

The wavelengths of the said channels are selected, according to the invention, from a first wavelength range $\Delta\lambda$ having a width of at least 3 nm. In its turn, this first wavelength range $\Delta\lambda$ is selected from a second wavelength range extending from 1300 nm to 1700 nm.

The said receiving apparatus is a conventional apparatus capable of demultiplexing the said m optical signals and of sending them to any subsequent processing stages.

Typically, the optical transmission line 1000 comprises an optical fibre, typically incorporated in a conventional optical cable.

Preferably, the said optical fibre is a single-mode fibre at the m transmission wavelengths $\lambda_1, \lambda_2 \ldots \lambda_m$. Additionally, it is, for example, of the step index, dispersion shifted and non-zero dispersion type (NZD) [G. P. Agrawal, "Nonlinear Fiber Optics", Academic Press, $2^{nd}$ ed., 1995, pp. 3, 10].

For example, in the optical communication system in FIG. 1, the transmitting apparatus wavelength multiplexes 8 (m=8) channels having wavelengths of $\lambda_1, \lambda_2 \ldots \lambda_8$, each of which is different from the others, selected from a range $\Delta\lambda$ of 7 nm. More particularly, the said wavelengths are:

$\lambda_1$=1554 nm;

$\lambda_2$=1555 nm;

$\lambda_3$=1556 nm;

$\lambda_4$=1557 nm;

$\lambda_5$=1558 nm;

$\lambda_6$=1559 nm;

$\lambda_7$=1560 nm; and $\lambda_8$=1561 nm.

Additionally, in the embodiment in FIG. 1, the optical transmission line 1000 comprises 2 optical amplification systems 11 and 12, each comprising 5 optical amplifiers in cascade. These optical amplifiers all have substantially the same gain spectrum $G(\lambda)$ in the said wavelength range $\Delta\lambda$ of 7 nm. For example, the gain spectrum $G(\lambda)$ of each amplifier is substantially of the Gaussian type:

$$G(\lambda) = G_{max} e^{-\frac{(\lambda-\lambda_c)^2}{2\sigma^2}}$$

where $G_{max}$ is the maximum value of gain, $\lambda_c$ is the wavelength of maximum gain and a denotes the distance between the wavelength at which the gain has the value $G_{max}/(e^{1/2})$ and $\lambda_c$.

In the embodiment shown in FIG. 1, $G_{max}$, expressed in dB, is equal to 17.2 dB, $\lambda_c$=1557.5 (in other words, the gain spectrum is symmetrical with respect to the mean value of $\lambda_1$–$\lambda_8$) and $\sigma$ is equal to approximately 5.157 nm. For this value of $\sigma$, the difference $\Delta G$ between the maximum value $G_{max}$ and the minimum value of gain (gain at wavelength $\lambda_1$ of 1554 nm or at wavelength $\lambda_8$ of 1561 nm) for each amplifier is equal to 1 dB.

The difference $\Delta G_{tot}$ between the maximum and the minimum of the total gain spectrum of each of the two optical amplification systems 11 and 12 is therefore equal to 5 dB.

The said optical amplifiers are, for example, optical amplifiers produced by the present applicant, having active fibres doped with erbium.

The optical fibre of the transmission line 1000 consists of a plurality of sections connected optically to the said optical amplifiers.

Each of the said sections of optical fibre has a length L and an attenuation per unit length $\alpha(l)$ selected in such a way that the value of the attenuation a of each section is substantially equal to the said maximum value of gain $G_{max}$. In this way, the total signal power (equal to the sum of the powers of the m channels) at the output of each optical amplifier is substantially equal to the total power at the input of the said optical transmission line 1000 and is substantially the same for all the optical amplifiers.

In the embodiment shown in FIG. 1, L is equal to 80 km, $\alpha(l)$ is equal to approximately 0.215 dB/km, the value of $\alpha$ of each section is equal to 17.2 dB (equal to $G_{max}$ expressed in dB) and the total signal power at the output of each optical amplifier is 7.94 mW.

Additionally, the optical fibre is characterized by a parameter $\gamma$ equal to 2 $W^{-1}km^{-1}$, an effective area $A_{eff}$ of 50 $\mu m^2$, a linear refractive index $n_0$ of 1.45 (D. Breuer et al., "Unrepeated 40 Gbit/s RZ Single Channel Transmission at 1.55 $\mu$m using various fiber types", IEEE J. Lightwave Technology, vol. 10, No. 6, pp. 822–824, 1998) and a predetermined curve which represents the variation $D(\lambda)$ of the chromatic dispersion D [expressed in ps/(nm*km)] as a function of the wavelength. This curve has a chromatic dispersion zero at the wavelength $(\lambda_0)$ of approximately 1565 nm, and, at this wavelength $\lambda_0$, has a slope of approximately 0.08 ps/(nm²*km); in other words:

$$\left.\frac{dD}{d\lambda}\right|_{\lambda_0} = 0.08 \ \frac{ps}{nm^2 * km}$$

Between the first optical amplification system 11 and the second 12 there is a filter 100 having an attenuation curve according to the present invention.

In one embodiment, the said filter 100 consists of a conventional optical fibre grating (A. M. Vengsarkar et al., "Long-period fiber gratings as band-rejection filters", IEEE Journal of Lightwave Technology, vol. 14, No. 58, pp. 58–65,1996).

In another embodiment, the said filter 100 consists of a conventional micro-optical dielectric device ("Optical fiber filters for wavelength division multiplexing", IEEE Circuits and Devices Magazine, vol. 12, No. 5, pp. 49–50).

Preferably, the values of the length L' and the attenuation $\alpha'$ of the section of optical fibre comprising the filter 100 are selected in such a way that the total attenuation (equal to the sum of $\alpha'$ and the mean attenuation introduced by the filter 100) of the said section of optical fibre is substantially equal to the attenuation $\alpha$ introduced by the other sections of optical fibre in which the filter 100 is not present. Thus the optical amplifier immediately after the said filter 100 has a total input power substantially equal to that of the other optical amplifiers.

For example, in FIG. 1, when the said filter 100 attenuates (as will be described subsequently) the power of the m optical signals according to the attenuation curve B in FIG. 3, L' is equal to approximately 49.8 km and $\alpha'$ is equal to approximately 10.7 dB.

The said filter 100 is capable of attenuating the power of the m optical signals according to an attenuation curve according to the present invention.

Figure 3:
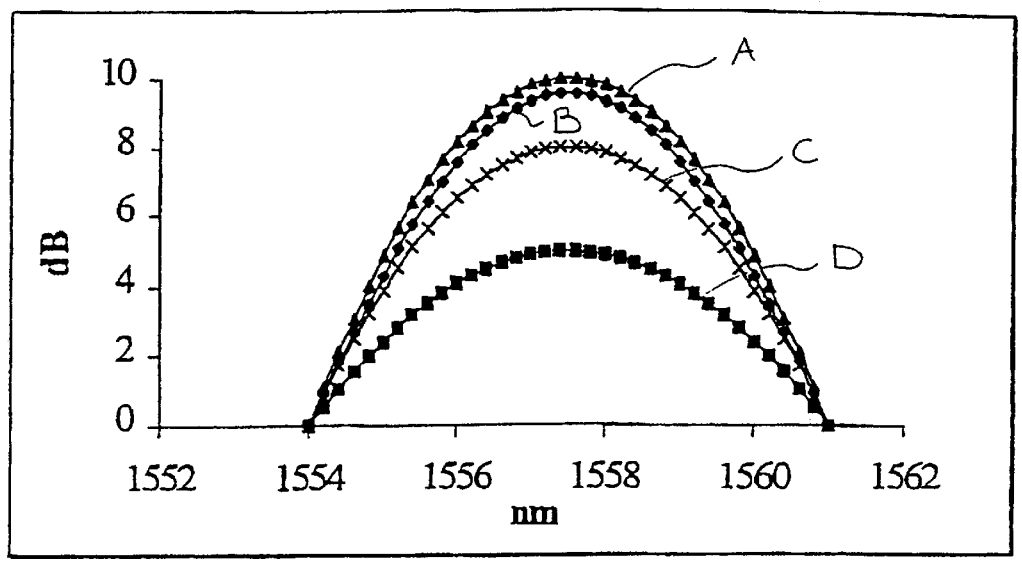
FIG. 3 shows three attenuation curves A, B, C of three embodiments of a filter according to the invention of the system shown in FIG. 1, and the attenuation curve (curve D) of a conventional filter for comparison.

FIG. 3 shows three attenuation curves, A, B, C, according to the invention, which were found for three different embodiments of the said filter 100 of the system in FIG. 1. In this figure, the wavelengths are expressed in nm and the values of attenuation are expressed in dB. Additionally, the latter relate to the minimum value of attenuation in the said wavelength range $\Delta\lambda$ which, in these examples, corresponds to the value of attenuation at the two wavelengths $\lambda_1$, $\lambda_8$ at the ends of $\Delta\lambda$. Thus the value of relative attenuation at the wavelengths $\lambda_1$, $\lambda_8$ is zero.

The curves A and C were found by means of appropriate computer simulations.

The curve B, on the other hand, was calculated by a formula (a)—shown below—which was devised by the inventors to determine an attenuation curve of a filter according to the invention for an optical communication system having, in general, m channels;

n optical amplification systems;

n−1 filters according to the invention connected between one amplification system and the next in a section of optical fibre having an attenuation $\alpha'$;

$N_1$ optical amplifiers in the first optical amplification system, $N_2$ in the second optical amplification system, $N_j$ in the j-th optical amplification system and $N_n$ in the n-th optical amplification system (where $N_1$, $N_2$, $N_j$, $N_n \geq 1$); and where the optical amplifiers of the said optical amplification system have gain spectrums which are substantially equal to each other.

According to formula (a), the n−1 filters according to the invention have an attenuation curve such that the q-th channel and the c-th channel are attenuated by values $L_q$ and $L_c$ respectively, so that $L_{c,q}$ (where $L_{c,q}$ is equal to the ratio of $L_q$ to $L_c$) conforms to the following relation:

$$\sum_{k=1}^{n} \left\{ \left[ p_k \Gamma_{c,q}^{(k)} \prod_{i=1}^{k-1} (r_{c,q}^{(i)})^{N_1} \right] \cdot (L_{c,q})^{k-1} \right\} = \frac{1}{m} \quad (a)$$

where:

$$\Gamma_{c,q}^{(k)} = \frac{1}{N_k m} \left[ \sum_{p=2}^{N_k} \left( \frac{g_q^{(k)}}{g_c^{(k)}} \right)^{p-1} + \frac{\alpha}{\alpha'} \right]; \quad p_k = \frac{N_k}{\sum_{j=1}^{n} N_j}; \quad L_{c,q} = \frac{L_q}{L_c};$$

$$g_c^{(k)} = \alpha * G_c^{(k)}; \quad g_q^{(k)} = \alpha * G_q^{(k)}; \quad r_{c,q}^{(k)} = \frac{g_q^{(k)}}{g_c^{(k)}}$$

and $\alpha$ is the attenuation of the sections of optical fibre without filters;

$G_c^{(k)}$ is the gain of the amplifiers of the k-th optical amplification system at the wavelength of the c-th channel; and $G_q^{(k)}$ is the gain of the amplifiers of the k-th optical amplification system a t the wavelength of the q-th channel.

As shown in FIG. 3, the curve A has a contrast $\Delta L$ of 10 dB, the curve B has a contrast of 9.5 dB, and the curve C has a contrast of 8 dB, where "contrast" denotes the difference between the maximum and minimum attenuation of these curves. According to the invention, therefore, the said curves have contrasts $\Delta L$ which are, respectively, 5 dB, 4.5 dB and 3 dB greater than the said $\Delta G_{tot}$.

They also show:

a maximum attenuation substantially at the centre of the said range of wavelengths $\Delta\lambda$;

a substantially bell-shaped form, similar to that of the total gain spectrum at the output of each of the two optical amplification systems 11 and 12, and symmetrical about the centre of the said range of wavelengths $\Delta\lambda$;

$\Delta\lambda$ varying from 1554 to 1561 nm; and a minimum attenuation at the two wavelengths $\lambda_1$, $\lambda_8$ at the ends of $\Delta\lambda$.

For the purpose of comparison, the inventors also determined the attenuation spectrum which a comparison filter would have if it were installed in an optical communication system having the same characteristic s as the system according to the invention in the first embodiment shown in FIG. 1 except for the fact that it comprises this comparison filter in place of the filter 100 according to the invention.

The comparison filter looked at was a conventional filter having, according to the prior art, an attenuation spectrum ["insertion loss", IL ($\lambda$)] equal to the total gain spectrum a t the output of the first optical amplification system 11 (FIG. 3, curve D):

$$IL(\lambda) = IL_0 e^{-\frac{(\lambda-\lambda_c)^2}{2\sigma^2}} = G_{tot}(\lambda)$$

where $\lambda_c$ is approximately 1557.5 nm, $\sigma$ is approximately 2.31 nm and $IL_0$ is equal to $G_{tot}(\lambda_c)$ which, expressed in dB, is approximately 5 dB. This attenuation spectrum therefore has a contrast equal to $\Delta G_{tot}$ (5 dB).

Typically, the powers of the m channels at the input of the transmission line 1000 are not all equal and are preferably associated with a pre-emphasis selected in such a way as to equalize the optical SNR at the end of the said transmission line 1000.

Thus the pre-emphasis required to equalize the optical SNR of the two systems was determined by computer simulation of the behaviour of the optical communication system according to the invention in the embodiment shown in FIG. 1 and of the system having the said comparison filter.

The values of pre-emphasis found, both for the optical communication system according to the invention having the filter 100 in the three embodiments shown in FIG. 3 (curves A, B, C) and for the system having the comparison filter (FIG. 3, curve D), are shown below:

| TYPE OF FILTER | PRE-EMPHASIS (dB) |
|---|---|
| Filter according to the invention | |
| curve A | 0.45 |
| curve B | 0.4 |
| curve C | 0.8 |
| Comparison filter | |
| curve D | 2.1 |

As can be seen, in the optical communication system described in this example, the filter according to the invention enables the optical SNR to be equalized with much lower values of pre-emphasis than does the comparison filter.

The values of pre-emphasis obtained in this way were then used in other simulations which were carried out to evaluate the extent of the known non-linear phenomenon of four wave mixing (FWM) in the system according to the invention and in the comparison system.

As a parameter indicating the performances of the m channels of these systems in the presence of FWM, the ratio $S_i/FWM_i$ was determined, in which:

⇒ the subscript "i" has a value varying from 1 to m according to the channel in question;

⇒ $S_i$ is the optical power of the i-th channel at the end of the transmission line 1000; and ⇒ $FWM_i$ is the optical power, measured at the end of the transmission line 1000, of the optical field generated by the FWM phenomenon at the wavelength of the i-th channel.

These ratios $S_i/FWM_i$ indicate the penalties introduced into the m channels by the non-linear phenomenon of FWM This is because the noise introduced by the FWM increases as the said ratios $S_i/FWM_i$ decrease.

It should be noted that, for the determination of these ratios, only the optical fields generated by the FWM about the wavelengths of the m channels were taken into account, since those generated at different wavelengths are typically filtered by the receiving apparatus, and therefore do no affect the performances of the various channels.

The values of the ratios $S_i/FWM_i$, found in this way for the optical communication system according to the invention having the filter 100, according to the three embodiments shown in FIG. 3 (curves A, B and C), and for the comparison system having the conventional filter with the attenuation curve D shown in FIG. 3, are shown below:

| CHANNEL | CURVE D | CURVE A | CURVE B | CURVE C |
|---|---|---|---|---|
| $\lambda_1$ | $S_1/FWM_1$ = 21.98 dB | $S_1/FWM_1$ = 25.00 dB | $S_1/FWM_1$ = 22.03 dB | $S_1/FWM_1$ = 23.05 dB |
| $\lambda_2$ | $S_2/FWM_2$ = 18.12 dB | $S_2/FWM_2$ = 20.88 dB | $S_2/FWM_2$ = 21.58 dB | $S_2/FWM_2$ = 20.46 dB |
| $\lambda_3$ | $S_3/FWM_3$ = 15.66 dB | $S_3/FWM_3$ = 17.52 dB | $S_3/FWM_3$ = 20.52 dB | $S_3/FWM_3$ = 20.89 dB |
| $\lambda_4$ | $S_4/FWM_4$ = 23.00 dB | $S_4/FWM_4$ = 21.78 dB | $S_4/FWM_4$ = 23.14 dB | $S_4/FWM_4$ = 24.47 dB |
| $\lambda_5$ | $S_5/FWM_5$ = 18.37 dB | $S_5/FWM_5$ = 18.28 dB | $S_5/FWM_5$ = 20.00 dB | $S_5/FWM_5$ = 24.86 dB |
| $\lambda_6$ | $S_5/FWM_6$ = 16.54 dB | $S_6/FWM_6$ = 17.54 dB | $S_6/FWM_6$ = 18.49 dB | $S_6/FWM_6$ = 20.72 dB |
| $\lambda_7$ | $S_7/FWM_7$ = 16.16 dB | $S_7/FWM_7$ = 18.94 dB | $S_7/FWM_7$ = 21.91 dB | $S_7/FWM_7$ = 20.79 dB |
| $\lambda_8$ | $S_8/FWM_8$ = 22.93 dB | $S_8/FWM_8$ = 21.85 dB | $S_8/FWM_8$ = 24.00 dB | $S_8/FWM_8$ = 24.77 dB |

As may be noted, the values of the ratios $S_i/FWM_i$ obtained with the optical communication system shown in FIG. 1 according to the invention are on average greater than those obtained with the comparison system. More particularly, with the filters having the three attenuation curves A, B and C according to the invention, the values of $S_i/FWM_i$ which were obtained were, respectively, approximately 1.1 dB, 2.4 dB and 3.4 dB greater than those obtained with the comparison system.

The system according to the invention therefore enables the penalties introduced into the m channels by the non-linear phenomenon of FWM to be reduced drastically compared with the comparison system.

For each particular case a person with average skill in the art will be capable of selecting, from the filters having an attenuation curve according to the present invention, the filter which, according to known parameters of the optical communication system, such as the number of amplifiers in each optical amplification system, the number optical amplification systems, the gain of the optical amplifiers of each system, the difference $\Delta G_{tot}$ between the maximum and minimum gain of each optical amplification system, and the number of channels, will minimize the undesired effects introduced into the m channels by the non-linear phenomena.

Preferably, in the case of an optical communication system having n optical amplification systems and n-1 filters according to the invention interposed between one optical amplification system and the next, the said contrast ΔL is smaller than the difference between the maximum and minimum of the total gain spectrum after all the n optical amplification systems, without filters interposed (after the whole cascade of optical amplifiers in the absence of filters), divided by the number of filters (n-1).

In another embodiment (not shown), an optical communication system according to the invention has the same structural and functional characteristics (for which reference should therefore be made to the preceding description) as the embodiment in FIG. 1, except in that the transmitting apparatus wavelength multiplexes 4 (m=4) channels having wavelengths $\lambda_1$, $\lambda_2$, $\lambda_3$, $\lambda_4$ which are different from each other. More particularly, the said wavelengths are:

$\lambda_1$=1558 nm;

$\lambda_2$=1559 nm;

$\lambda_3$=1560 nm; and $\lambda_4$=1561 nm.

By a method similar to that described above for the preceding embodiment shown in FIG. 1, the following values of the ratios $S_i/FWM_i$ were thus found, both for this embodiment of the system according to the invention with the filter 100 in the two embodiments shown in FIG. 3 (curves A and B) and for a comparison system having the conventional filter with the attenuation curve D shown in FIG. 3:

| CHANNEL | CURVE D | CURVE A | CURVE B |
|---|---|---|---|
| $\lambda_1$ | $S_1/FWM_1$ = 12.54 dB | $S_1/FWM_1$ = 15.67 dB | $S_1/FWM_1$ = 15.65 dB |
| $\lambda_2$ | $S_2/FWM_2$ = 12.62 dB | $S_2/FWM_2$ = 16.50 dB | $S_2/FWM_2$ = 16.67 dB |
| $\lambda_3$ | $S_3/FWM_3$ = 12.64 dB | $S_3/FWM_3$ = 17.74 dB | $S_3/FWM_3$ = 17.82 dB |
| $\lambda_4$ | $S_4/FWM_4$ = 18.32 dB | $S_4/FWM_4$ = 19.41 dB | $S_4/FWM_4$ = 19.49 dB |

In this case also, the values of $S_i/FWM_i$ obtained with the optical communication system according to the invention are on average greater than those obtained with the comparison system. More particularly, with the filters having the two attenuation curves A and B according to the invention, the values of $S_i/FWM_i$ which were obtained were, respectively, approximately 3.3 dB and 3.4 dB greater than those obtained with the comparison system.

Figure 2:
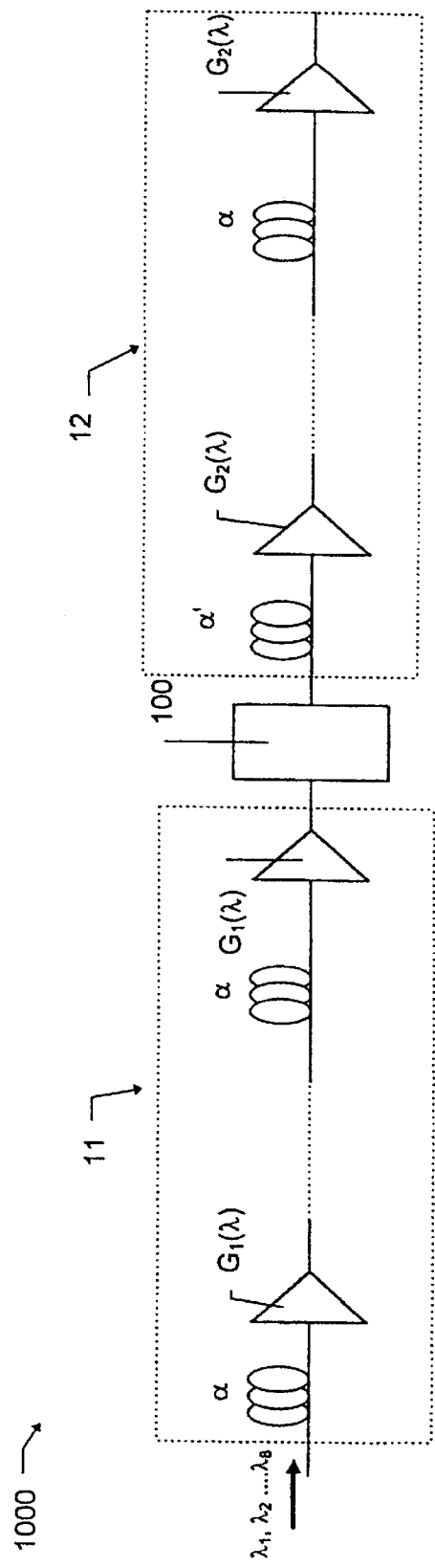
FIG. 2 shows another embodiment of an optical communication system according to the invention.

FIG. 2 shows a further embodiment of an optical transmission system 1 which has the same structural and functional characteristics (for which reference should therefore be made to the preceding description) as the embodiment in FIG. 1, except for the fact that ⇒ each of the two optical amplification systems 11 and 12 has 10 optical amplifiers, ⇒ the optical amplifiers of the first system 11 have a gain spectrum $G_1(\lambda)$ different from the gain spectrum $G_2(\lambda)$ of the optical amplifiers of the second system 12 [$G_1(\lambda) \neq G_2(\lambda)$], ⇒ the filter 100 takes different forms, and ⇒ a different pre-emphasis is associated with the 8 channels.

More particularly, in the said range of wavelengths Δλ of 7 nm, the gain spectrum G(λ) of the said optical amplifiers is essentially of the Gaussian type:

$$G(\lambda) = G_{max} e^{-\frac{(\lambda - \lambda_c)^2}{2\sigma^2}}$$

where, for $G_1(\lambda)$:
⇒ $G_{max}$ expressed in dB is equal to 17.2 dB,
⇒ $\lambda_c = 1557.5$,
⇒ σ=8.15 nm;
and, for $G_2(\lambda)$:
⇒ $G_{max}$ expressed in dB is equal to 17.2 dB,
⇒ $\lambda_c = 1559.5$,
⇒ σ=9.06 nm.

For the optical amplifiers of the first optical amplification system 11, the difference $\Delta G_1$ between the maximum value $G_{max}$ and the minimum value of gain (that at the wavelengths $\lambda_1$ and $\lambda_8$), expressed in dB, is equal to 0.4 dB, and therefore the difference $\Delta G_{1,tot}$ between the maximum and the minimum of the total gain spectrum at the output of the said first optical amplification system 11 is equal to 4 dB.

In turn, for the optical amplifiers of the second optical amplification system 12, the difference $\Delta G_2$ between the maximum value $G_{max}$ and the minimum value of gain (that at the wavelength $\lambda_1$), expressed in dB, is equal to 0.8 dB, and therefore the difference $\Delta G_{2,tot}$ between the maximum and the minimum of the total gain spectrum at the output of the said second optical amplification system 12 is equal to 8 dB.

The smallest $\Delta G_{tot,min}$ between the values $\Delta G_{tot}$ of the two optical amplification systems 11 and 12 is therefore equal to 4 dB.

Figure 4:
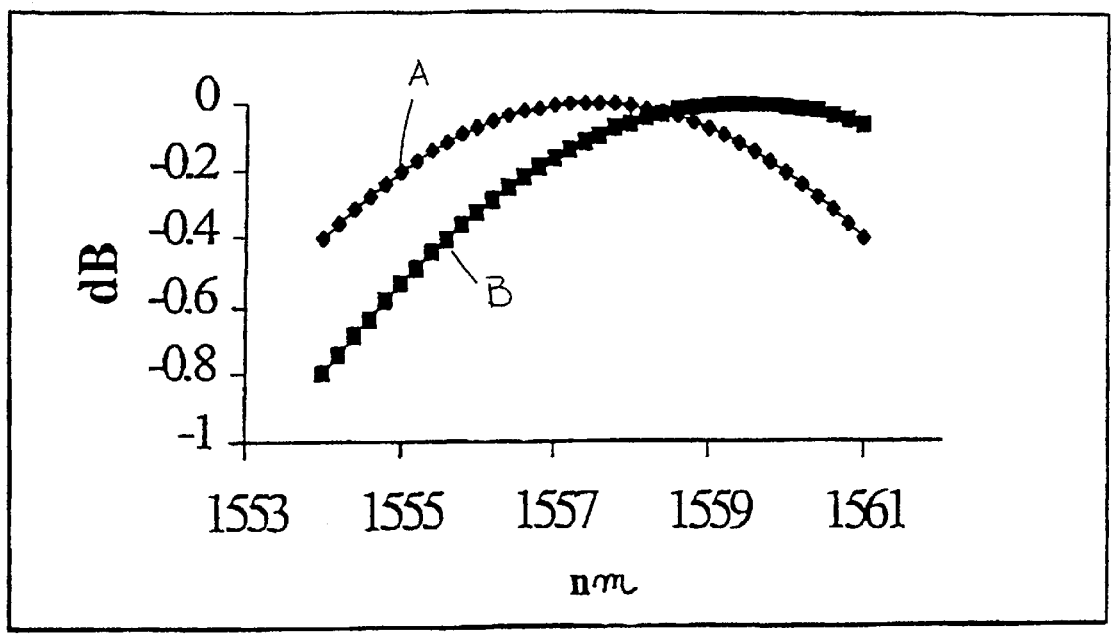
FIG. 4 shows the gain spectra $G_1(\lambda)$ (curve A) and $G_2(\lambda)$ (curve B) of optical amplifiers belonging, respectively, to a first and a second optical amplification system of the communication system shown in FIG. 2.

FIG. 4 shows the spectra of $G_1(\lambda)$—curve A—and $G_2(\lambda)$—curve B. In this figure, the wavelengths are expressed in nm while the values of gain are expressed in dB and are relative to the maximum value of gain in the said range of wavelengths Δλ.

Figure 5:
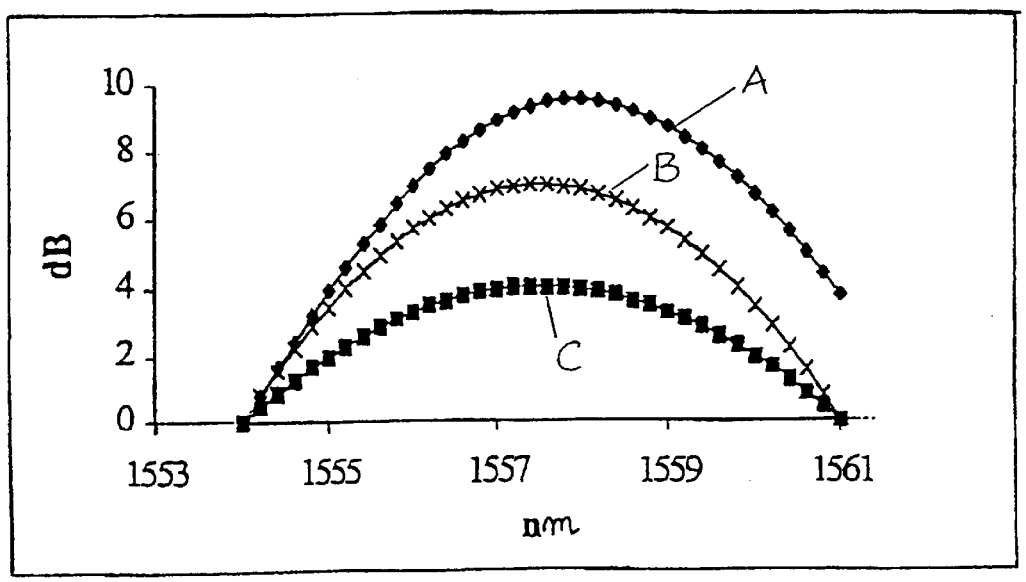
FIG. 5 shows two attenuation curves A and B of two embodiments of a filter according to the invention of the system shown in FIG. 2 and the attenuation curve (curve C) of a conventional filter for comparison.

FIG. 5 shows the attenuation curves A and B according to the invention which were found, by computer simulations, for two embodiments of the filter 100 of the optical communication system shown in FIG. 2. In FIG. 5, the wavelengths are expressed in nm, while the values of attenuation are expressed in dB and are relative to the minimum value of attenuation in the said range of wavelengths Δλ.

As shown in FIG. 5, the curve A shows:
a contrast ΔL of 9.5 dB;
a ΔL which is 5.5 dB greater than the said $\Delta G_{tot,min}$;
a maximum attenuation at a distance of approximately 0.4 nm from the centre of the said range of wavelengths Δλ;
a substantially bell-shaped form;
a ΔL ranging from 1554 and 1561 nm; and
a minimum attenuation at the wavelength $\lambda_1$ at the left-hand end of the said Δλ.

In its turn, the curve B shows:
a contrast ΔL of 7 dB;
a ΔL which is 3 dB greater than the said $\Delta G_{tot,min}$;
a maximum attenuation substantially in the centre of the said range of wavelengths Δλ;
a substantially bell-shaped form;
a ΔL ranging from 1554 to 1561 nm; and p1 two minimum attenuations at the wavelengths $\lambda_1$ and $\lambda_2$ at the ends of the said Δλ.

The attenuation spectrum which a comparison filter would have if it were installed in an optical communication system having the same characteristics as the system according to the invention in the embodiment in FIG. 2, except for the fact that it comprises the said comparison filter in place of the filter 100, was also determined for the purpose of comparison.

The comparison filter looked at was a conventional filter having, according to the prior art, an attenuation spectrum ["insertion loss", IL(λ)] equal to the total gain spectrum at the output of the first optical amplification system 11 (FIG. 5, curve C):

$$IL(\lambda) = IL_0 e^{-\frac{(\lambda - \lambda_c)^2}{2\sigma^2}} = G_{tot}(\lambda)$$

where $\lambda_c$ is approximately 1557.5 nm, σ is approximately 2.58 nm and $IL_0$ is equal to $G_{tot}(\lambda_c)$ which, expressed in dB, is approximately 4 dB. This attenuation spectrum therefore has a contrast equal to $\Delta G_{1,tot}$ (4 dB).

Computer simulation of the behaviour of the optical communication system according to the invention, in the embodiment shown in FIG. 2, and of the comparison system with the said conventional filter, was used in this way to determine the pre-emphasis of the powers of the m channels at the input of the transmission line 1000 required to equalize the optical SNR of the two systems.

The values of pre-emphasis found in this way both for the optical communication system according to the invention having the filter 100 according to the two embodiments in FIG. 5 (curves A and B), and also for the system having the said comparison filter with the attenuation curve C in FIG. 5, are shown below:

| TYPE OF FILTER | PRE-EMPHASIS (dB) |
| --- | --- |
| Filter according to the invention | |
| curve A | 0.35 |
| curve B | 1.67 |
| Comparison filter | |
| curve C | 1.64 |

As may be seen, in the optical communication system according to this example the value of pre-emphasis obtained with the filter having the attenuation curve A according to the invention is much lower than that obtained with the comparison filter. In turn, the value of pre-emphasis obtained with the filter having the attenuation curve B according to the invention is substantially the same as that obtained with the comparison filter.

These values of pre-emphasis were subsequently used in other simulations which were carried out to evaluate the extent of the non-linear phenomenon of four wave mixing in the system according to the invention and in the comparison system.

The values of the ratios $S_i/FWM_i$ which were determined in this way for the optical communication system according to the invention having the filter 100 according to the two embodiments in FIG. 5 (curves A and B) and for the comparison system having the conventional filter with the attenuation curve C in FIG. 5 are shown below.

| CHANNEL | CURVE C | CURVE A | CURVE B |
|---|---|---|---|
| $\lambda_1$ | $S_1/FWM_1$ = 20.18 dB | $S_1/FWM_1$ = 20.06 dB | $S_1/FWM_1$ = 20.20 dB |
| $\lambda_2$ | $S_2/FWM_2$ = 16.07 dB | $S_2/FWM_2$ = 18.66 dB | $S_2/FWM_2$ = 16.22 dB |
| $\lambda_3$ | $S_3/FWM_3$ = 12.14 dB | $S_3/FWM_3$ = 18.44 dB | $S_3/FWM_3$ = 13.50 dB |
| $\lambda_4$ | $S_4/FWM_4$ = 17.53 dB | $S_4/FWM_4$ = 20.16 dB | $S_4/FWM_4$ = 24.84 dB |
| $\lambda_5$ | $S_5/FWM_5$ = 15.51 dB | $S_5/FWM_5$ = 17.00 dB | $S_5/FWM_5$ = 23.07 dB |
| $\lambda_6$ | $S_6/FWM_6$ = 12.53 dB | $S_6/FWM_6$ = 15.06 dB | $S_6/FWM_6$ = 12.70 dB |
| $\lambda_7$ | $S_7/FWM_7$ = 13.10 dB | $S_7/FWM_7$ = 15.71 dB | $S_7/FWM_7$ = 13.20 dB |
| $\lambda_8$ | $S_8/FWM_8$ = 17.23 dB | $S_8/FWM_8$ = 18.54 dB | $S_8/FWM_8$ = 21.63 dB |

In this example also, the values of the ratios $S_i/FWM_i$ obtained with the optical communication system in FIG. 2 according to the invention are on average higher than those obtained with the comparison system. More particularly, with the filters having the two attenuation curves A and B according to the invention, the values of $S_i/FWM_i$ were found to be, on average, approximately 2.4 dB and 2.6 dB higher, respectively, than those obtained with the comparison system.

In the system according to this example, therefore, the filter having the attenuation curve B in FIG. 5 according to the invention reduces the non-linear phenomena even with a value of pre-emphasis substantially equal to that provided by the comparison system.

Although an optical communication system comprising a transmitting apparatus, a receiving apparatus and an optical transmission line with a cascade of optical amplifiers and with at least one filter according to the invention has been described by way of example, the optical communication system according to the invention may also comprise other devices such as adapters, opto-electronic regenerators, optical-optical regenerators, and switching nodes in an optical network, where multiple transmission lines converge and originate, according to principles which will be evident to the person skilled in the art, on the basis of the present description and without departure from the principle of the invention.

The aforesaid adapters are interface units capable of receiving m digital optical signals supplied by the transmitting apparatus and adapting them to the characteristics required by the optical transmission line. For example, the said interface units are capable of converting the wavelengths of the m digital optical signals to wavelengths within the operating bandwidth of the optical amplifiers of the optical transmission line.

U.S. Pat. No. 5,267,073 held by the present applicant, the description of which is incorporated by reference, describes interface units comprising, in particular, a transmission adapter capable of converting an optical input signal to a form suitable for the optical transmission line, and a reception adapter capable of reconverting the transmitted signal to a form suitable for a receiving apparatus.

Finally, typical examples of the aforesaid optical-optical regenerators are described by L. Billès et al. ["20 Gbit/s Optical 3R Regenerator using SOA based Mach-Zehnder Interferometer Gate", ECOC September (1997), No. 448, pp. 269–272] and by D. Chiaroni et al. ["New 10 Gbit/s 3R NRZ optical regenerative interface based on semiconductor optical amplifiers for all-optical networks", ECOC September(1997), No. 448, pp. 41–44].

What is claimed is:

1. An optical communication system comprising:
   (a) a first apparatus for supplying at least three optical signals, each having a predetermined wavelength selected from a first range of wavelengths $\Delta\lambda$ and a preselected optical power;
   (b) an optical transmission line optically connected to said first apparatus, for the transmission of the at least three optical signals, said optical transmission line comprising:
       i.) at least one optical amplification system having a predetermined gain spectrum which, in said first range of wavelengths $\Delta\lambda$, has a maximum and a minimum gain, the difference between the maximum and minimum gain being $\Delta G_{tot}$, and
       ii.) at least one filter associated with said at least one optical amplification system and capable of attenuating said optical power of the at least three optical signals according to a predetermined attenuation curve as a function of the wavelength, the attenuation curve having, in said first range of wavelengths $\Delta\lambda$, a maximum and a minimum attenuation, the difference between the maximum and the minimum being $\Delta L$; and
   c) a second apparatus for receiving the at least three optical signals,
       wherein said power of the at least three optical signals is associated with a preselected pre-emphasis and the $\Delta L$ is at least 0.5 dB greater than $\Delta G_{tot}$.

2. An optical communication system according to claim 1, wherein said first range of wavelengths $\Delta\lambda$ is at least 3 nm.

3. An optical communication system according to claim 1, wherein said first range of wavelengths $\Delta\lambda$ is selected from a second range of wavelengths between 1300 nm and 1700 nm.

4. An optical communication system according to claim 1, wherein said at least one optical amplification system comprises at least one optical amplifier.

5. An optical communication system according to claim 1, further comprising at least one filter located after said at least one optical amplification system.

6. An optical communication system according to claim 1, wherein the $\Delta L$ is at least 0.75 dB greater than $\Delta G_{tot}$.

7. An optical communication system according to claim 1 or 5,
   wherein the maximum of the attenuation curve of said filter is located at a distance less than or equal to 5 nm from the center of said first range of wavelengths $\Delta\lambda$.

8. An optical communication system according to claims 1 or 5,
   wherein the minimum of the attenuation curve of said filter is located approximately at one of the two endpoints of said first range of wavelengths $\Delta\lambda$.

9. An optical communication system according to claim 1, wherein said pre-emphasis is selected in such a way that there is an equalized optical signal to noise ratio after said optical transmission line.

10. A method for optimizing the performance of a WDM optical communication system, comprising:

a) supplying at least three optical signals, each having a predetermined power and having a predetermined wavelength selected from a first range of wavelengths $\Delta\lambda$;

b) sending the at least three optical signals along an optical transmission line;

c) amplifying, in said optical transmission line, the at least three optical signals according to a predetermined gain spectrum which, in said first range of wavelengths $\Delta\lambda$, has a maximum and minimum gain, the difference between the maximum and the minimum gain being $\Delta G_{tot}$;

d) attenuating the power of the at least three optical signals, amplified in this way, according to a predetermined attenuation curve as a function of the wavelength, the attenuation curve having, in said first range of wavelengths $\Delta\lambda$, a maximum and minimum attenuation, the difference between the maximum and the minimum being $\Delta L$; and e) receiving, after said optical transmission line, the at least three optical signals,
wherein said power of the at least three optical signals is associated with a preselected pre-emphasis and the $\Delta L$ is at least 0.5 dB greater than the $\Delta G_{tot}$.

* * * * *